UNITED STATES PATENT OFFICE 2,205,181

METHOD OF TEMPERING GLASS ARTICLES, AND BATH THEREFOR

William W. Shaver, Corning, N. Y., assignor to Corning Glass Works, Corning, N. Y., a corporation of New York No Drawing. Original application July 31, 1935, Serial No. 34,107. Divided and this application June 2, 1937, Serial No. 146,120

8 Claims. (Cl. 49—45)

This invention, which is a division of my co-pending application, Serial Number 34,107, filed July 31, 1935, relates to glass and more particularly to a method of tempering or case hardening glass articles.

Present and past methods used for the case hardening of glass articles by first heating them to an elevated temperature, then plunging the heated articles into a liquid bath comprising oil, waxes, resins, or the like, heated to a lower temperature or subjecting the heated articles to air blasts or any other means for rapid cooling, do not, in general, produce a uniform and satisfactory case hardening of the article over its entire surface without introducing an objectionable or even serious amount of warping. The use of molten metals or alloys as glass tempering media is particularly liable to cause warpage on account of the great difference in specific gravity between the metal and the glass. Heated oil and like organic media are relatively unstable at the temperatures most useful for tempering glass, and because the most useful temperatures are near or above the flash point of the oil, a fire hazard is introduced into the process. Moreover, the carbonization and other effects of high temperatures on oil change the thermal transfer condition between the bath and the heated glass article with the result that methods employing oils and the like organic media have definite limitations. Past methods, also, in the case of certain glasses have resulted in a lack of chemical stability of the surface after the chilling operation and the surface appearance also at times is seriously affected.

The object of this invention is a method of tempering or case-hardening glass articles which will produce a uniform and definite degree of temper without danger of warpage of the articles nor serious effect upon the surface stability thereof and without introducing any fire hazard.

The above and other objects may be accomplished by employing my invention which embodies among its features heating and/or quenching the glass article in a glass tempering bath composed of a molten inorganic salt or salts the density or specific gravity of which is substantially the same as that of the glass which is to be tempered.

Another feature of my invention comprises heating the article which is to be tempered in a bath of molten inorganic salt or salts and chilling the glass in a bath which will dissolve the constituents of the heating bath.

Other objects and features will become apparent as the description proceeds.

In practicing my invention I first heat the glass article which is to be tempered to a temperature slightly below the softening temperature of the glass by immersing it in a bath of molten inorganic salt or mixture of salts the selection of which depends upon various considerations as will later appear. After the article has become uniformly heated to the desired temperature, I remove it from the heating bath and immediately plunge it and completely immerse it into a cooling bath which is heated to a lower temperature depending upon the kind of glass and the degree of temper desired, and which preferably is composed of a mixture of molten inorganic salts having essential properties, as will appear, but which under certain circumstances may comprise heated oil or other prior liquid cooling baths. The chilling step may even comprise subjecting the heated article to an air blast in known manner, the novel feature in this instance residing in the method of heating the article uniformly to a high temperature without warpage and loss of surface stability. Alternatively, the heating step may comprise heating the article in a muffle or open air furnace to be followed by chilling or quenching the article in a bath of molten inorganic salts as above described.

To illustrate the preferred embodiment of my invention, I give the following example of my method as applied to the glass $B_2$ of the Sullivan and Taylor Patent 1,304,623, issued May 27, 1919.

This glass has a softening temperature of about 813° C. A slab of this glass having a width of 1¼ inches, a thickness of 1/16 inch and a length of 7 inches was heated by immersing it for two minutes in a molten mixture comprising about 67% of sodium sulfate and 33% of potassium chloride by weight and containing a small amount of tungstic oxide, the latter of which was added at intervals to keep the bath non-alkaline. The molten bath was maintained at a temperature of 800° C. and had a density of about 1.9 as compared to about 2.3 for the glass. After being heated for two minutes, which sufficed to bring the glass to uniform temperature, the slab was removed and immediately quenched in a molten bath comprising about 44% of sodium nitrite and 56% of potassium nitrate by weight heated to 150° C.

Subsequent measurements of the tempered glass slab showed that it had suffered no distortion exceeding a very few thousandths of an inch.

The mechanical strength of the tempered slab was shown by impact tests to be very appreciably greater than that of other slabs which had the same dimensions and which were tempered by heating in an ordinary atmospheric furnace and chilled in a bath of 600W oil heated to 150° C. Incidentally appreciable warpage was encountered in the latter case, due to the slabs having been heated in an open furnace in accordance with the common method of heating.

As a special feature of the above described method, the following is to be noted. The chilling bath, which consists of a molten mixture of potassium nitrate and sodium nitrite readily dissolves and removes from the heated glass article the residual salts which adhere to it when it is removed from the heating bath preparatory to quenching it, thereby cleaning the glass and exposing it practically instantaneously to the cooling action of the chilling bath. Briefly, this is explained as follows: Potassium nitrate melts at approximately 335° C. and will dissolve sodium nitrite at that temperature in all proportions. The eutectic mixture of these two salts melts at about 141° C. These salts, when molten, will also dissolve at 150° C. a small percentage of sodium chloride, potassium chloride, sodium sulfate and others, the percentage of which is thus dissolvable increasing with increased temperature. Hence, when the glass which is being treated is removed from the heating bath with a layer of the salt from the heating bath adhering to it, this layer of salt becomes dissolved into the potassium nitrate-sodium nitrite chilling bath.

Another feature of my method which has outstanding importance is the fact that due to some property of molten inorganic salts the temperature of the chilling bath accurately determines the degree of temper which will be obtained. That is to say, the final stress which will be obtained by quenching a given glass heated to a given temperature into a molten salt chilling bath will vary inversely as the temperature of the chilling bath. The degree of temper which is obtained under the same conditions by using an oil chilling bath is practically independent of the temperature of the chilling bath and hence such a bath has a very limited use.

In tempering articles made of glass other than the glass above referred to, such as, for example, ordinary lime glass which has a softening temperature in the neighborhood of 700° C., it is necessary to employ lower temperatures in the heating bath in order not to heat the glass above its softening point. My method is applicable to all kinds of glass and to a great variety of shapes of ware.

The successful practice of my invention depends largely upon the following considerations:

1. The salt or combination of salts for the heating bath must melt and remain molten at a temperature below that to which the glass articles must be heated prior to chilling.

2. The molten salt baths and particularly the heating bath which operates at the higher temperature must not attack the glass which is immersed in it in the time which is required to bring the glass to the desired temperature.

3. The density of the heating bath should be sufficiently near to that of the glass to permit the bath to act as a support to prevent the glass article from warping.

Other minor requirements, but nevertheless desirable properties of my improved baths, are as follows:

a. The vapor pressure of the salts employed should be low enough to avoid excessive evaporation at the temperatures employed.

b. The salts which comprise the heating bath and which necessarily adhere to the glass when it is withdrawn therefrom should not react too violently with the medium which is used for chilling.

c. The baths should be non-poisonous and the fumes should be non-injurious to health.

The following is a list of salts and mixtures of salts which I have found will fulfill the above requirements and which have successfully been used as heating baths: sodium chloride, potassium chloride, sodium chloride and potassium chloride mixed in equal parts by weight, sodium sulfate and sodium chloride (2 to 1 by weight), sodium bromide, potassium bromide, sodium bromide and potassium bromide mixed, sodium bromide and sodium sulfate mixed, potassium sulfate and sodium chloride mixed, cuprous chloride, cuprous chloride and potassium chloride mixed, sodium chloride and potassium chloride and strontium chloride mixed, sodium dihydrogen phosphate, sodium tungstate combined with alkali chlorides or bromides, etc. Obviously many other combinations of the above recited components may be found suitable. Since the softening points and specific gravities of different glasses vary widely, it is impossible to state the proportions of any of the above recited baths which will be suitable for all glasses, but for any individual glass the proper proportions can easily be determined by trial. It will further be apparent that some of the above recited heating bath compositions may also be found suitable for use as cooling baths.

Some salt mixtures which I have found to be particularly suitable as chilling baths both as regards wide range of temperature of operation and economy are as follows: sodium nitrate and potassium nitrate mixed, sodium nitrite and potassium nitrate mixed, sodium nitrate alone, potassium nitrate alone, ammonium acid sulfate, lithium nitrate and sodium nitrate and potassium nitrate and potassium nitrite mixed, potassium chloride and cuprous chloride mixed, zinc chloride alone, potassium chloride and zinc chloride mixed, potassium acid sulfate, sodium acid sulfate, sodium acid sulfate and potassium acid sulfate and others. It will be apparent that various combinations of the above named salts other than those mentioned above may also be used.

In general, it has been found necessary to prevent the heating bath from becoming alkaline through decomposition or volatilization, since otherwise many common types of glasses would thereby be attacked and the surfaces thereof etched or the stability of the surface would be greatly diminished. This I accomplish by introducing into the bath a small amount of an acid oxide such as tungstic oxide, $WO_3$, or sand, $SiO_2$, or very small percentages of boric oxide, $B_2O_3$. I may also use ammonium salts, such as ammonium sulfate or ammonium chloride, which on decomposition release an acid radical in the bath. Such additions are preferably made in small increments from time to time as required. In the case of a bath composed of sodium chloride and potassium chloride, it was found that the introduction of sand or about .25% of boric oxide resulted in a better surface stability in the case of the above mentioned glass $B_1$ of the Sullivan and Taylor patent than was obtained without the addition of one or the other of these oxides.

I claim:

1. In a method of tempering glass, the steps of melting a salt which tends to become alkaline on decomposition to form a bath, maintaining said bath at a temperature at which it will tend to decompose, maintaining in said bath a small quantity of a material which will neutralize the alkalinity of the bath, and immersing the glass in said bath.

2. In a method of tempering glass, the steps of melting a salt which tends to become alkaline on decomposition to form a bath, maintaining said bath at a temperature at which it will tend to decompose, maintaining in said bath a small quantity of boric oxide to neutralize the alkalinity of the bath, and immersing the glass in said bath.

3. In a method of tempering glass, the steps of melting a salt which tends to become alkaline on decomposition to form a bath, maintaining said bath at a temperature at which it will tend to decompose, maintaining in said bath a small quantity of ammonium sulfate to neutralize the alkality of the bath, and immersing the glass in said bath.

4. In a method of tempering glass, the steps of melting a salt which tends to become alkaline on decomposition to form a bath, maintaining said bath at a temperature at which it will tend to decompose, maintaining in said bath a small quantity of tungstic oxide to neutralize the alkalinity of the bath, and immersing the glass in said bath.

5. A substantially anhydrous fluid treating bath for glassware comprising a molten salt of an alkali metal and a substance which will react with free alkali and prevent the bath from becoming alkaline.

6. A substantially anhydrous fluid treating bath for glassware comprising a molten salt of an alkali metal and boric oxide.

7. A substantially anhydrous fluid treating bath for glassware comprising a molten salt of an alkali metal and ammonium sulfate.

8. A substantially anhydrous fluid treating bath for glassware comprising a molten salt of an alkali metal and containing tungstic oxide.

WILLIAM W. SHAVER.